US008588871B1

United States Patent
Arnold (10) Patent No.: US 8,588,871 B1
(45) Date of Patent: Nov. 19, 2013

(54) SIGNAL DETECT BATTERY SAVER

(71) Applicant: Blake Arnold, San Francisco, CA (US)

(72) Inventor: Blake Arnold, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/645,224

(22) Filed: Oct. 4, 2012

(51) Int. Cl.
*H04B 1/38* (2006.01)

(52) U.S. Cl.
USPC ........................................ 455/574; 455/343.2

(58) Field of Classification Search
USPC ................. 455/434, 574, 456.4, 343.2–343.4
See application file for complete search history.

(56) References Cited

U.S. PATENT DOCUMENTS

| 6,526,286 B2 * | 2/2003 | Wan .............................. 455/515 |
| 7,403,774 B2 | 7/2008 | Chandra et al. |
| 7,460,891 B2 | 12/2008 | Koch et al. |
| 7,808,939 B2 * | 10/2010 | Bansal et al. ................. 370/310 |
| 2005/0239498 A1 | 10/2005 | Dorenbosch et al. |
| 2007/0232282 A1 | 10/2007 | Barbaresi et al. |
| 2009/0047991 A1 | 2/2009 | Elg |
| 2009/0258649 A1 | 10/2009 | Salowey |
| 2010/0255858 A1 * | 10/2010 | Juhasz ....................... 455/456.4 |
| 2011/0122780 A1 | 5/2011 | Nieminen et al. |

OTHER PUBLICATIONS

Khanafer et al., "An Efficient Adaptive Backoff Algorithm for Wireless Sensor Networks," IEEEXplore Digitial Library, Global Telecommunication Conference, Dec. 5-9, 2012, 6 pp. (Abstract only).

* cited by examiner

*Primary Examiner* — Raymond Dean (74) *Attorney, Agent, or Firm* — Shumaker & Sieffert, P.A.

(57) ABSTRACT

A computing device deactivates a sensor device after the sensor device is unable to detect a signal. A second sensor device, different from the deactivated sensor device, receives information that indicates whether the deactivated sensor device can detect a signal. The computing device activates the deactivated sensor device after the computing device determines that the deactivated sensor device can detect a signal. The determination is based, at least in part, on the information received by the second sensor device.

20 Claims, 5 Drawing Sheets

SIGNAL DETECT BATTERY SAVER

BACKGROUND

One feature of a mobile device is the device's operational use time, i.e. the duration for which the device may be continuously used as a function of the device's stored energy (e.g. battery) capacity. Most mobile devices are designed to automatically search or poll for signals from various wireless communication networks (e.g. cellular phone, Wi-Fi, 3G). Searching for network signals uses electrical power. If the mobile device is in a location for an extended period of time, where the network signal strength is low or non-existent (commonly referred to as 'dead zones'), the device may perform continuous polling. Continuous polling for network signals uses excessive electrical power and can reduce a device's operational use time.

To prevent premature battery drain from excessive signal searching, some mobile devices permit users to manually place the device in a mode such as 'airplane mode' or 'off mode'. This prevents the device from continuously searching for a signal when the user has reason to believe that network communication is not possible (e.g. when the user is in a remote area, a building, on an airplane, or on a subway). This form of manual user intervention is cumbersome, inefficient, and inconvenient. Furthermore, this method of user intervention relies on the user to know the user is in a dead zone (e.g., an area with no detectable signal). It may not always be apparent to the user that the device is operating in a dead zone, for example if the user is moving from one location to another and not closely monitoring the network signal strength being reported by the device.

SUMMARY

In some examples a computing device can activate a previously deactivated sensor device based on information included in signals received by sensor devices different from the deactivated sensor.

In one example, the disclosure is directed to a method performed by a computing device having at least one processor. In response to determining, by the computing device, that a first sensor device of the computing device is unable to detect a first signal at a first point in time, the method comprising, identifying, by the computing device, a second sensor device of the computing device to receive information that indicates whether the first sensor device is able to detect the first signal. The method further comprising receiving, by the computing device using the second sensor device, the information, wherein the information is usable by the computing device to determine whether the first sensor device can detect the first signal. The method further comprising determining, based at least in part on the information and by the computing device, the first sensor device is able to detect the first signal at a second point in time. Responsive to determining the first sensor device is able to detect the first signal at the second point in time, the method further comprising activating, by the computing device, the first sensor device.

In another example, the disclosure is directed to a computer-readable medium including instructions. The instructions cause a programmable processor to perform operations in response to determining that a first sensor device of the computing device is unable to detect a first signal at a first point in time. The operations include deactivating the first sensor device. The operations further include identifying a second sensor device of the computing device to receive information that indicates whether the first sensor device is able to detect the first signal. The operations further include receiving, using the second sensor device, the information, wherein the information is usable to determine whether the first sensor device can detect the first signal. The operations further include determining, based at least in part on the information, the first sensor device is able to detect the first signal at a second point in time. Responsive to determining that the first sensor device is able to detect the first signal at the second point in time, the operations further include activating the first sensor device.

In another example, the disclosure is directed to a system comprising one or more processors, the one or more processors being configured to perform operations, in response to determining, by the system, that a first sensor device of the system is unable to detect a first signal at a first point in time. The operations include deactivating, by the system, the first sensor device. The operations further include identifying, by the system, a second sensor device of the system to receive information that indicates whether the first sensor device is able to detect the first signal. The operations further include receiving, by the system using the second sensor device, the information, wherein the information is usable to determine whether the first sensor device can detect the first signal. The operations further include determining, based at least in part on the information and by the system, the first sensor device is able to detect the first signal at a second point in time. Responsive to the system determining that the first sensor device is able to detect the first signal at the second point in time, the operations further include activating the first sensor device.

The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure is directed to techniques for minimizing power consumption by a mobile computing device (e.g. cellular phone, tablet computers) when the device is in a location where the likelihood of receiving and/or transmitting a signal by the device is low. For instance, a computing device commonly has more than one sensor, with each sensor capable of receiving and/or transmitting a signal (e.g. cellular, Wi-Fi, 3G, Bluetooth, GPS, etc.). The computing device may determine a first sensor cannot detect a first signal (e.g. a cellular phone loses signal in a subway tunnel) and to preserve battery power, the computing device may deactivate the first sensor.

In some examples, in addition to deactivating the first sensor, the computing device may detect a second signal using a second sensor (e.g. the cellular phone may detect a Wi-Fi signal outside the subway tunnel). Using information received with the second sensor, the computing device may determine a probability of the first sensor detecting the first signal. If, based on the probability, the computing device determines the first signal is likely detectable by the first sensor, the computing device may use the second sensor to receive a second signal to activate the first sensor. By selectively deactivating a first sensor after no longer detecting a first signal and using the second sensor to selectively activate the first sensor based on a determination made using information received by a second sensor, the computing device may minimize excessive power consumption normally caused by constant signal searching and polling.

Figure 1:
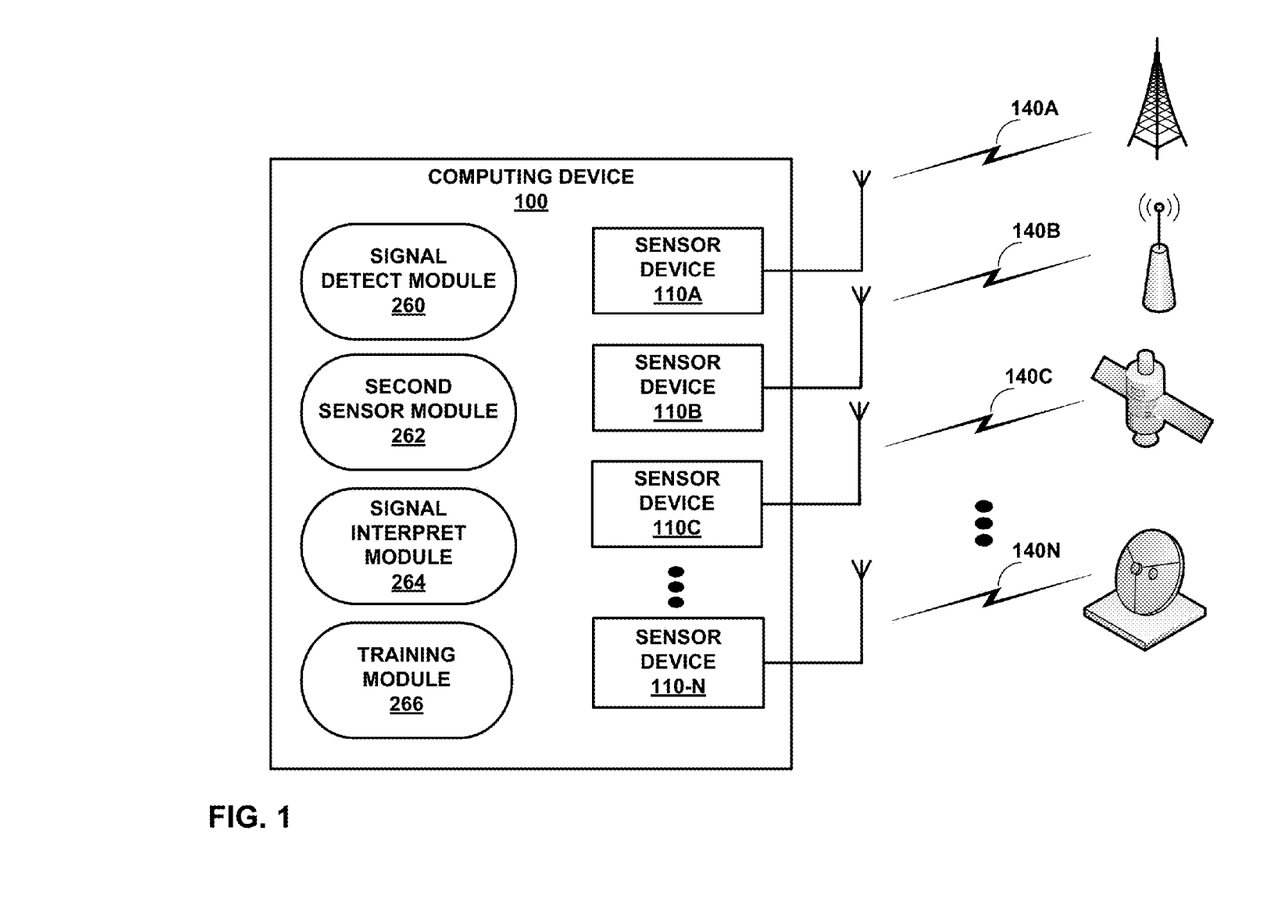
FIG. 1 is a conceptual diagram illustrating an example computing device.

FIG. 1 is a conceptual diagram illustrating an example of a computing device 100. In the example of FIG. 1, computing device 100 is a smartphone. However, other examples of, computing device 100 may be a cellular phone, a personal digital assistant (PDA), a laptop computer, a tablet computer, a portable gaming device, a portable media player, an e-book reader, a watch, or another type of portable or mobile device.

As shown in FIG. 1, computing device 100 may include a group of one or more sensor devices 110A-110N (collectively referred to as "sensor devices 110") operatively coupled to the computing device. Examples of sensor devices 110 include wireless communication devices capable of transmitting and/ or receiving communication signals such as a cellular radio, a 3G radio, a Bluetooth radio, or a Wi-Fi radio. Other examples of sensor devices 110 include a GPS (Global Positioning System) radio, an accelerometer, a gyroscope, a proximity sensor, a light sensor, a temperature sensor, or a pressure (or grip) sensor. FIG. 1 depicts sensor device 110A as a cellular radio, sensor device 110B as a Wi-Fi radio, and sensor device 110C as a GPS radio. While cell, Wi-Fi, and GPS devices are shown in FIG. 1 the techniques of the disclosure may apply to any sensor devices.

Sensor devices 110 may detect (i.e. receiving and interpreting) a group of one or more signals 140A-140N (collectively referred to as "signals 140"). For example, FIG. 1 depicts signal 140A as a cellular signal and signal 140B as a Wi-Fi signal. Cellular radio 110A may detect cellular signal 140A which includes signal data (i.e., information) derivable from the signal into a human or machine understandable message (e.g. binary code). Cellular radio 110A may derive a signal strength associated with cellular signal 140A. Each of the signals 140 may correspond to one or more sensor devices 110. For example, cellular radio 110A may detect cellular signal 140A, but not Wi-Fi signal 140B. Likewise, Wi-Fi radio 110B may detect Wi-Fi signal 140B, but not cellular signal 140A. FIG. 1 depicts signal 140A as a cellular signal, signal 140B as a Wi-Fi signal, and signal 140C as a GPS signal. While cell, Wi-Fi, and GPS signals are shown in FIG. 1 the techniques of the disclosure may apply to a multitude of signals that include information useful to computing device 100 for determining whether a sensor device 110 can detect signal 140. Information included within each signal and interpreted by computing device 100 may include data representative of a device location, a device direction, a device speed, a device acceleration, a device orientation, a network service set identifier, or any other type data associated with computing device 100 or the environment which computing device 100 operates in.

In a default setting, computing device 100 may operate with all sensors devices 110 activated (e.g. turned on and consuming electrical power). In accordance with techniques of the disclosure, to preserve stored electrical energy, computing device 100 may automatically deactivate and/or activate individual sensor devices 110 based on the signal strength and/or the information of signals 140 detected by sensor devices 110.

As shown in FIG. 1, computing device 100 may include signal detect module 260, second sensor module 262, signal interpret module 264, and training module 266. Modules 260-266 may perform operations described herein using software, hardware, or a mixture of both hardware and software residing in and executing on computing device 100. Computing device 100 may execute modules 260-266 with multiple processors. Computing device 100 may execute modules 260-266 as a virtual machine on underlying hardware.

Computing device 100 may determine that a first sensor device 110A is unable to detect a first signal 140A at a first point in time, and in response, deactivate first sensor device 110A. For example, signal detect module 260 of computing device 100 may process all signals received by sensor devices 110 and pair each signal 140 detected by the computing device 100 with each sensor device 110 that detects the signal 140. Based on all signals 140 received, signal detect module 260 may determine cellular radio 110A cannot detect cellular signal 140A, and in response, deactivate cellular radio 110A to conserve electrical power. Similarly, signal detect module 260 may determine cellular radio 110A can detect only a weak cellular signal 140A. Signal detect module 260 may process a weak signal as an undetectable signal and in response; deactivate cellular radio 110A to conserve electrical power.

In response to determining that first sensor device 110A is unable to detect first signal 140A at a first point in time, computing device 100 may identify a second sensor device 110B (different from first sensor device 110A) of the group of sensor devices 110 to receive information that indicates whether first sensor device 110A is able to detect first signal 140A. In other words, in response to determining that first signal 140A is undetectable by first sensor device 110A, computing device 100 may identify a second sensor device 110B that can receive information (e.g., signal data) usable to determine whether the first signal 140A is detectable by the first sensor device 110A. For example, in response to computing device 100 determining that cellular radio 110A cannot detect cellular signal 140A, signal detect module 260 of computing device 100 may identify Wi-Fi radio 110B as a sensor device 110 that can still detect Wi-Fi signal 140B. Second sensor module 262 of computing device 100 may identify multiple potential sensor devices 110 that can receive a signal 140 that includes information that computing device 100 can use to determine whether a deactivated sensor device 110 can detect a signal 140. However, second sensor module 262 may identify only one sensor device 110 as the second sensor device 110B based at least in part on whether the identified second sensor device 110B can currently detect signal 140.

For example, second sensor module 262 of computing device 100 may identify both Wi-Fi radio 110B and GPS radio 110C as two potential sensor devices 110 that can both normally detect information usable to determine whether or not cellular radio 140A can detect cellular signal 140A. Second sensor module 262 may determine that Wi-Fi radio 110B can normally detect Wi-Fi signal 140B that includes Wi-Fi information. For instance, signal interpret module 264 of computing device 100 may interpret Wi-Fi signal 140B as including a Service Set Identifier (SSID) within Wi-Fi signal 140B. Second sensor module 262 may also determine that a GPS radio 110C can normally detect a GPS signal 140C which includes GPS information. Signal interpret module 264 of computing device 100 may interpret GPS signal 140C as including a geographic location within GPS signal 140C. Signal detect module 260 of computing device 100 may determine that Wi-Fi radio 110B can presently detect Wi-Fi signal 140B and GPS radio 110C cannot presently detect GPS signal 140C. Second sensor module 262 of computing device 100 may identify Wi-Fi radio 110B as the second sensor device because, out of the two potential sensor devices 110, Wi-Fi radio 110B can presently detect Wi-Fi signal 140B that includes information usable to determine if cellular radio 110A can detect cellular signal 140A.

Second sensor module 262 may use a machine learning system of training module 266 to identify the second sensor device if multiple potential second sensor devices 110 can presently detect a signal 140 (e.g. the scenario described above, however GPS radio 110C can also presently detect GPS signal 140C). Types of machine learning systems used by training module 266 include Bayesian networks, neural networks, and other types of artificial intelligent models. A machine learning system may receive as inputs, a group (or a snapshot) of observed signals (i.e. signals detected by sensor devices) and information from at least one second signal detected by a second sensor. The machine learning system may create rules for each sensor device that corresponds to whether a given sensor can detect a given signal based on the current snapshot of observed signals and the information within the second signal. The machine learning system may output the probability determined by the rule. Computing device 100 may activate a sensor if the probability outputted by the machine learning system exceeds a threshold, and therefore indicates a degree of certainty that the sensor can detect a signal.

For example, training module 266 may include a machine learning system that creates rules for predicting whether a sensor can detect a signal. The machine learning system may base the rules on observed signals and information (e.g. signal profiles) received at the times when a sensor device 110 could and could not detect a signal 140. Based on these rules, the machine learning system of training module 266 may output a probability as to whether a sensor device 110 may receive information usable to determine whether a different sensor device can detect a signal. Second sensor module 262 may use the probability output from the training module 266 to identify the second sensor device.

Each time cellular radio 110A cannot detect cellular signal 140A, the machine learning system of training module 266 may store an observed signal profile. The observed signal profile may indicate all signals 140 detected by sensor devices 110 at a time prior to (e.g., 0-5 seconds) computing device 100 determining that cellular radio 110A cannot detect cellular signal 140A. An example signal profile may indicate to the machine learning system that computing device 100 can detect Wi-Fi signal 140B and GPS signal 140C but cannot detect a 3G signal 140D (included implicitly within the group of sensor devices 110A-N but not explicitly depicted in FIG. 1). Each time the cellular signal 140A becomes detectable again, the machine learning system of training module 266 may store an additional observed signal profile. The additional signal profile may indicate all signals 140 detected by sensor devices 110 at a time subsequent to (e.g., 0-5 seconds) computing device 100 determining cellular radio 110A can detect cellular signal 140A. The additional signal profile may indicate computing device 100 can detect Wi-Fi signal 140B, GPS signal 140C, and 3G signal 140D. Machine learning system of training module 266 may correlate the observed and additional signal profiles with an SSID 'X' interpreted from the information of Wi-Fi signal 140B by signal interpret module 264. The machine learning system of training module 266 may also correlate the observed and additional signal profiles with a location 'Y' interpreted from the information of GPS signal 140C by signal interpret module 264.

Over time, the machine learning system may store several similar signal profiles based on whether computing device 100 can detect a cellular signal 140A. From the above example, the machine learning system of training module 266 may create a rule that assigns a probability (e.g. a 70% chance) to cellular radio 110A detecting cellular signal 140A when the information from Wi-Fi signal 140B indicates SSID 'X' and the 3G radio 110D detects 3G signal 140D. The machine learning system of training module 266 may create a rule that also assigns a probability (e.g. 15% chance) to cellular radio 110A detecting cellular signal 140A when the information from GPS signal 140C indicates location 'Y' and the 3G radio 110D detects 3G signal 140D. Using this rule, along with the techniques described previously, second sensor module 262 may identify Wi-Fi radio 110B as the second sensor because the probability outputted from training module 266 exceeds a threshold (e.g. 50%) and Wi-Fi radio 110B can currently detect Wi-Fi signal 140B. Second sensor module 262 may not identify GPS radio 110C as the second sensor, even though GPS radio 110C can detect GPS signal 140C, because the probability outputted from training module 266 corresponding to GPS radio 110C as a second sensor, does not exceed the threshold. The descriptions below, in relation to the additional figures, describe in more detail the machine learning system of training module 266 used to identify the second sensor.

After deactivating first sensor device 110A, computing device 100 may receive information, using second sensor device 110B, usable to determine whether sensor device 110A can detect signal 140A. For example, second sensor module 262 of computing device 100 may identify Wi-Fi radio 110B as the second sensor based on a determination that Wi-Fi radio 110B can receive information usable by computing device 100 to determine if cellular radio 110A can detect cellular signal 140A. Wi-Fi radio 110B may receive Wi-Fi signal 140B and signal interpret module 264 of computing device 100 may identify information within Wi-Fi signal 140B. The information may indicate a SSID of a wireless network.

Computing device 100 may determine that first sensor device 110A is able to detect first signal 140A at a second point in time (i.e. at a point in time subsequent to the first point in time when the first sensor 110A could not detect a signal 140), based at least in part, on information received by second sensor device 110B. In response to determining first sensor device 110A is able to detect first signal 140A at the second point in time, computing device 100 may activate sensor device 110A. For example, signal interpret module 264 may interpret the Wi-Fi information of Wi-Fi signal 140B as indicating the SSID of a wireless outdoor network within a large metropolitan park. Signal interpret module 264 of computing device 100 may determine cellular radio 110A can likely detect cellular signal 140A, based at least in part, on the SSID.

Signal interpret module 264 of computing device 100 may use the machine learning system of training module 266 (also utilized by second sensor module 262 described above) to determine whether the information (e.g., the SSID in this example) indicates cellular radio 110A can detect cellular signal 140A. For example, the machine learning system of training module 266 may observe one or more signal profiles, as discussed above and include one or more rules for determining a probability as to whether cellular radio 110A can detect cellular signal 140A. Using a signal profile, a previously created rule, and the information interpreted by signal interpret module 264, the machine learning system of training module 266 may assign a probability as to whether cellular radio 110A can detect cellular signal 140A. If the probability outputted by the machine learning system of training module 266 exceeds a threshold (e.g. 50%), signal interpret module 264 of computing device 100 may determine cellular radio 110A can detect cellular signal 140A. Signal detect module 260 of computing device 100 may activate cellular radio 110A based on this determination. The descriptions below, in relation to the additional figures, describe in more detail the machine learning system of training module 266.

Computing device 100 may perform techniques of this disclosure to automatically deactivate a sensor device 110 that cannot detect a signal 140 at a first point in time, until information received by a different sensor device at a second point in time indicates the sensor can detect a signal again. The techniques of this disclosure may conserve electrical energy stored within a computing device 100 by selectively powering on only those sensor devices capable of detecting a signal. These techniques may also prevent the computing device from wasting stored electrical energy by continuous searching or polling for an undetectable signal. Furthermore, these techniques may allow a computing device 100 to use a machine learning system to determine if a sensor device can or cannot detect a signal based on information received from other sensor devices.

Figure 2:
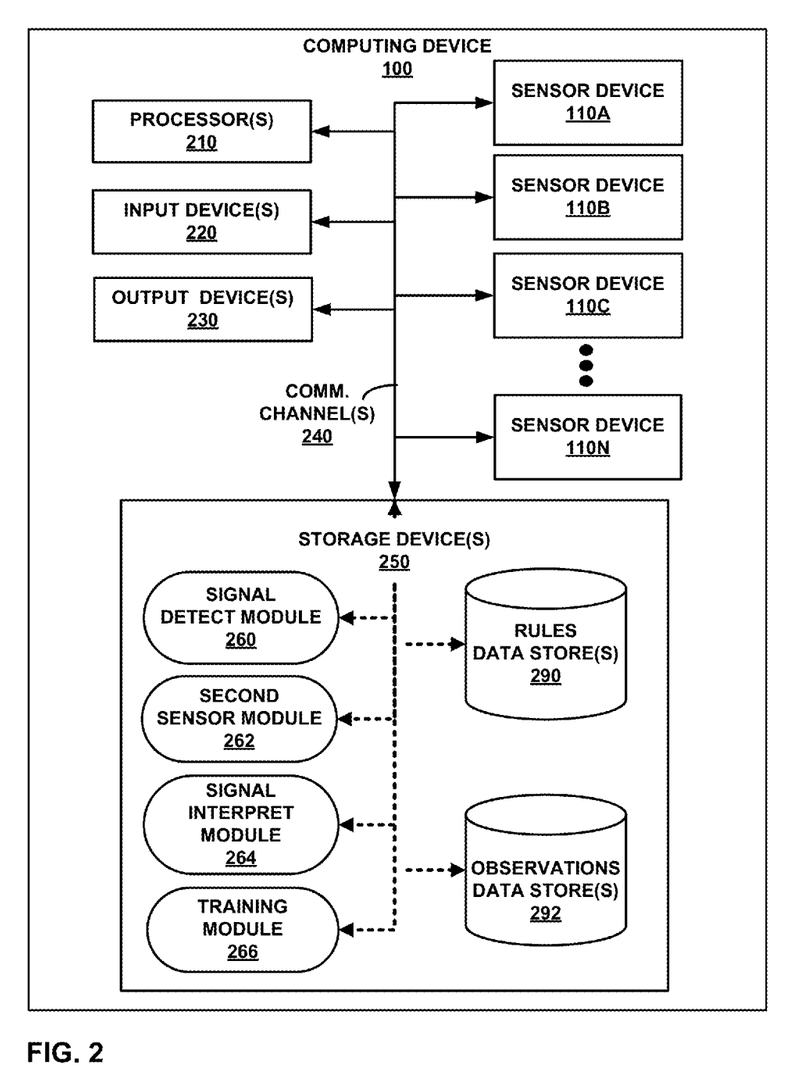
FIG. 2 is a block diagram illustrating an example configuration of the computing device.

FIG. 2 is a block diagram illustrating an example configuration of the computing device 100. FIG. 2 illustrates one particular example of computing device 100, and many other example configurations of computing device 10 may exist. As shown in the specific example of FIG. 2, computing device 100 includes one or more processors 210, one or more input devices 220, one or more output devices 230, one or more sensor devices 110A through 110N (collectively referred to as sensor devices 110), and one or more storage devices 250. In this example, storage device 250 of computing device 100 also includes a signal detect module 260, a second sensor module 262, a signal interpret module 264, a training module 266, one or more rule data stores 290, and one or more observation data stores 292. Communication channels 240 may interconnect each of the components 220, 230, 240, 110, 250, 260, 262, 264, 266, 290, and 292 for inter-component communications (physically, communicatively, and/or operatively). In some examples, communication channels 240 may include a system bus, a network connection, an inter-process communication data structure, or any other method for communicating data.

Sensor devices 110 and modules 260 through 266 of FIG. 2 may provide similar capability and functionality to computing device 100 as sensor devices 110 and modules 260 through 266 of FIG. 1. For readability, the description of FIG. 2 may refer to sensor devices 110 of FIG. 2 detecting signals 140 of FIG. 1, even though signals 140 are not shown in FIG. 2.

One or more processors 210 may implement functionality and/or execute instructions within computing device 100. For example, processors 210 may process instructions stored in storage device 250 that execute the functionality of signal detect module 260.

One or more storage devices 250 within computing device 100 may store information required for use during operation of computing device 100. Storage device 250, in some examples, has the primary purpose of being a short term and not a long term computer-readable storage medium. Storage device 250 on computing device 100 may be a volatile memory and therefore not retain stored contents if powered off. Examples of volatile memories include random access memories (RAM), dynamic random access memories (DRAM), static random access memories (SRAM), and other forms of volatile memories known in the art. Storage device 250 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 210 on computing device 100 read and execute instructions stored by storage device 250. In addition, modules 260 through 266 may store information within storage device 250 during program execution. Likewise, data stores 290 and 292 may store information within storage device 250 during program execution.

Computing device 100 may include one or more input devices 220 that computing device 100 uses to receive input, via tactile, audio, or video feedback. Input devices 220 of computing device 100, in one example, includes a presence-sensitive screen, a touch-sensitive screen, a mouse, a keyboard, a voice responsive system, video camera, microphone or any other type of device for detecting an input from a human or machine.

Computing device 100 may include one or more output devices 230 that computing device 100 uses to provide output, via tactile, audio, or video stimuli. Output device 230 of computing device 100, in one example, includes a presence-sensitive screen, a sound card, a video graphics adapter card, or any other type of device for converting a signal into an appropriate form understandable by human or machine. Additional examples of output device 230 include a speaker, a cathode ray tube (CRT) monitor, a liquid crystal display (LCD), or any other type of device that can generate intelligible output to a human or a machine.

Storage device 250 of computing device 100 may store program instructions and/or data associated with signal detect module 260, second sensor module 262, signal interpret module 264, and training module 266. For example, signal detect module 260 may include instructions that cause processors 210 of computing device 100 to perform one or more of the operations and actions described in the present disclosure.

In accordance with the techniques of this disclosure, computing device 100 may deactivate sensor device 110A in response to determining that sensor device 110A is unable to detect first signal 140A. For example, similar to the example of FIG. 1, sensor device 110A may be a cellular radio. Cellular radio 110A may receive a cellular signal 140A and transmit cellular signal 140A over communication channels 240 to signal detect module 260. Cellular radio 110A may no longer receive a cellular signal 140A and therefore stop transmitting cellular signal 140A to signal detect module 260. Signal detect module 260 may determine cellular radio 110A can no longer detect cellular signal 140A and deactivate cellular radio 110A (e.g., turn off electrical power to cellular radio 110A).

For purposes of this disclosure, determining that a sensor device of computing device 100 is unable to detect a signal 140 may include determining that a signal 140 has a weak signal strength. For example, computing device 100 may deactivate sensor device 110A in response to determining that signal 140A comprises a signal strength that is below a strength threshold. Signal detect module 260 may determine a signal with a strength of less than a strength threshold (e.g., −100 decibels) is equivalent to receiving no signal and therefore is undetectable. Signal detect module 260 may determine signal 140A comprises a low signal strength of −110 decibels and in response deactivate cellular radio 110A based on the low signal strength.

In response to determining computing device 100 cannot detect signal 140A, computing device 100 may identify a second sensor device 110B (different from sensor device 110A) of the group of sensor devices 110 to receive information that indicates whether first sensor device 110A is able to detect first signal 140A. For example, signal detect module 260 may communicate to second sensor module 262 over communication channels 240 that Wi-Fi radio 110B can detect Wi-Fi signal 140B. Second sensor module 262 may query training module 266 for a probability of whether Wi-Fi radio 110B can receive signal data (i.e., information) both prior and subsequent to cellular radio 110A detecting cellular signal 140A. If the probability received from training module 266 exceeds a threshold (e.g. 50-100%), second sensor module 262 may determine Wi-Fi radio 110B can receive information usable to determine whether cellular radio 110A can detect cellular signal 140A. A high probability may indicate Wi-Fi radio 110B can likely detect Wi-Fi signal 140B irrespective of whether or not cellular radio 110A can detect cellular signal 140A.

Training module 266 may utilize a machine learning system to determine a probability of whether Wi-Fi radio 110A can receive information (i.e., signal data) both prior and subsequent to cellular radio 110A detecting cellular signal 140A. The machine learning system may develop rules for determining the probability based on previously observed signal profiles and previously detected information. Training module 266 may store the rules within rules data store 290 for subsequent retrieval and use by the machine learning system for determining a second sensor.

For example, to develop a rule for determining a second sensor device that can receive information usable to determine if cellular radio 110A can detect cellular signal 140A, training module 266 may determine a candidate group of signals that at least one sensor device 110 can detect prior to determining that cellular radio 110A cannot detect cellular signal 140A and subsequent to determining that cellular radio 110A can detect cellular signal 140A.

Training module 266 may determine a first group of signals (e.g. signal profile) that may indicate each signal 140 detected by at least one sensor device 110 prior to the computing device 100 determining that cellular radio 110A can no longer detect cellular signal 140A. The first group of signals may represent the signals detectable between 0 and 5 seconds before computing device 100 determines cellular radio 110A cannot detect cellular signal 140A. For instance computing device 100 may detect Wi-Fi signal 140B, GPS signal 140C, and Bluetooth signal 140D prior to determining by signal detect module 260 that cellular radio can no longer detect cellular signal 140A and training module 266 may store the signal profiles of the first group of signals within observations data store 292.

In addition to determining the first group of signals, training module 266 may determine a second group of signals. The second group of signals may indicate each signal 140 detected by at least one sensor device 110 subsequent to the computing device 100 determining that cellular radio 110A can detect cellular signal 140A (i.e., the second signal profile may represent a 'snapshot' of each signal observed by computing device 100 after cellular signal 140A becomes detectable again). The second group of signals may represent the signals detectable between 0 and 5 seconds after computing device 100 determines cellular radio 110A can detect cellular signal 140A again. For instance computing device 100 may detect Wi-Fi signal 140B, Bluetooth signal 140D, and 3G signal 140E subsequent to determining by computing device 100 that cellular radio can detect cellular signal 140A and training module 266 may store the signal profiles of the second group of signals within observations data store 292.

Using the first and second groups of signals stored within observations data store 292, training module 266 may determine the group of candidate signals. The group of candidate signals may include the signals in in both the first and second groups of signals. For instance, training module 266 may determine the group of candidate signals includes Wi-Fi signal 140B and Bluetooth signal 140D.

Training module 266 may determine a correlation between the group of candidate signals and the information received by the second sensor device. The correlation may indicate a degree of a relationship between the group of candidate signals and the information. The degree may fall within a range of magnitudes (e.g. −1.0 to +1.0). For example, training module 266 may determine the group of candidate signals includes Wi-Fi signal 140B and Bluetooth signal 140D. As explained above, second sensor module 262 may identify Wi-Fi radio 110B as a potential second sensor device because Wi-Fi radio 110B can detect Wi-Fi signal 140B. Signal interpret module 264 may determine Wi-Fi signal 140B includes an SSID. Training module 266 may determine a correlation between computing device 100 detecting Wi-Fi signal 140B and Bluetooth signal 140D when Wi-Fi signal 140B includes data including the SSID associated with Wi-Fi signal 140B. The correlation may indicate the strength of a relationship (e.g. −1.0 for a weak relationship and +1.0 for a strong relationship) between computing device 100 receiving Wi-Fi signal 140B including a SSID and detecting both Wi-Fi signal 140B and Bluetooth signal 140D. The machine learning system of training module 266 may create a rule based on the correlation and store the rule within rules data store 290. The rule may indicate that if cellular radio 110A cannot detect cellular signal 140A, and if Wi-Fi radio 110B can receive Wi-Fi signal 140B with a SSID, then computing device 100 can use Wi-Fi radio 110B as a second sensor to determine when cellular radio 110A can detect cellular signal 140A.

Based at least in part on the correlation, training module 266 may determine a probability that the second sensor device can receive the information prior to the first signal being detectable by the first sensor device and subsequent to the first signal being detectable by the first sensor device. For example, using the rule created by the machine learning system of training module 266 and stored within rules data store 290, training module 266 may assign a probability to Wi-Fi radio 110B detecting Wi-Fi signal 140B while cellular radio 110A cannot detect cellular signal 140A. As discussed above, training module 266 may transmit the probability to second sensor module 262 and if the probability exceeds a threshold, second sensor module 262 may determine Wi-Fi radio 110B can receive information usable to determine whether cellular radio 110A can detect cellular signal 140A and therefore identify Wi-Fi radio 110B as the second sensor.

After deactivating sensor device 110A, computing device 100 may receive information, using the second sensor, usable to determine whether sensor device 110A can detect signal 140A. For example, second sensor module 262 of computing device 100 may identify Wi-Fi radio 110B as the second sensor. Wi-Fi radio 110B may receive Wi-Fi signal 140B and may communicate Wi-Fi signal 140B over communication channels 240 to signal interpret module 264. Signal interpret module 264 may identify information within Wi-Fi signal 140B. For instance, signal interpret module 264 may identify a SSID within Wi-Fi signal 140B.

Computing device 100 may determine that sensor device 110A can detect signal 140A, based at least in part, on the information received by the second sensor device 110B, and in response, computing device 100 may activate sensor device 110A. For example, signal interpret module 264 may interpret the Wi-Fi information of Wi-Fi signal 140B as indicating the SSID of a wireless outdoor network within a large metropolitan park. Signal interpret module 264 of computing device 100 may determine cellular radio 110A can likely detect cellular signal 140A, based at least in part, on the SSID. Based on this determination, signal interpret module 264 may transmit a command over communication channels 240 to signal detect module 260. The command may indicate to signal detect module 260 to activate cellular radio 110A. Signal detect module 260 may receive the command and activate cellular radio 110A.

Signal interpret module 264 may utilize the machine learning system of training module 266 to determine if information received by Wi-Fi radio 110A indicates cellular radio 110A can detect cellular signal 140A. For example, signal interpret module 264 may query training module 266 to obtain a probability of whether cellular radio 110A can detect cellular signal 140A based on the information included within Wi-Fi signal 140B. If the probability received by signal interpret module 264 exceeds a minimum threshold (e.g. 50-100%), signal interpret module may determine cellular radio 110A can detect cellular signal 140A and send a command to signal detect module 260 to activate cellular radio 110A. Signal interpret module 264 may also receive the probability of cellular radio 110A detecting the cellular signal 140A from a remote to the computing device.

The machine learning system of training module 266 may determine the probability of cellular radio 110A detecting cellular signal 140A using observations stored within observations data store 292 and rules created by the machine learning system stored within rules data store 290. The machine learning system may develop rules for determining the probability based on previously observed signal profiles and previously detected information. Training module 266 may store the rules within rules data store 290 for subsequent retrieval and use by the machine learning system for determining a second sensor.

For example, training module 266 may determine a group of activation signals. The group of activation signals may represent each signal 140 detected by sensor devices 110 as reported by signal detect module 260 subsequent to signal detect module 260 determining that cellular radio 110A can once again detect cellular signal 140A (i.e., the activation signals may represent a 'snapshot' of each signal detectable by computing device 100 between 0 and 5 seconds after computing device 100 determines cellular radio 110A can detect cellular signal 140A again). In continuing the example above, the group of activation signals may include Wi-Fi signal 140B, Bluetooth signal 140D, and 3G signal 140E. Training module 266 may store or retrieve the group of activation signals within the observations data store 292.

The machine learning system of training module 266 may determine a correlation between the group of activation signals and the information received by the second sensor device. The correlation may indicate a degree of a relationship between the group of activation signals and the information. The degree may fall within a range of magnitudes (e.g. −1 to +1).

For example, training module 266 may determine the group of activation signals includes Wi-Fi signal 140B, Bluetooth signal 140D, and 3G signal 140E. As explained above, second sensor module 262 may identify Wi-Fi radio 110B as a potential second sensor device because Wi-Fi radio 110B can detect Wi-Fi signal 140B. Signal interpret module 264 may determine Wi-Fi signal 140B includes an SSID. Training module 266 may determine a correlation between computing device 100 detecting Wi-Fi signal 140B, Bluetooth signal 140D, and 3G signal 140E when Wi-Fi signal 140B includes data including the SSID associated with Wi-Fi signal 140B. The correlation may indicate the strength of a relationship between computing device 100 receiving Wi-Fi signal 140B including a SSID and detecting Wi-Fi signal 140B, Bluetooth signal 140D, and 3G signal 140E. The machine learning system of training module 266 may create a rule based on the correlation and store the rule within rules data store 290. The rule may indicate that if computing device 100 deactivates cellular radio 110A, and if Wi-Fi radio 110B receives a particular SSID within Wi-Fi signal 140B, and if computing device 100 detects Wi-Fi signal 140B, Bluetooth signal 140D, and 3G signal 140E, then cellular radio 110A can detect cellular signal 140A.

Based at least in part on the correlation, the machine learning system of training module 266 may determine a probability of the first signal being detectable by the first sensor device based at least in part on the correlation. For example, using the rule created by the machine learning system of training module 266 and stored within rules data store 290, training module 266 may assign a probability to cellular radio 110A detecting cellular signal 140A. As discussed above, training module 266 may transmit the probability to signal interpret module 264 and if the probability exceeds a threshold, signal interpret module 264 may determine cellular radio 110A can detect cellular signal 140A.

Computing device 100 may share observations stored by the machine learning system of training module 266 with a remote computing device. The remote computing device may include a similar machine learning system to the machine learning system of training module 266 described above. The remote computing system may receive observations from computing device 100 and also receive similar observations from other devices. Remote computing device 100 may use the observations to generate information used by computing device 100 in determining whether to activate a sensor device. In addition, remote computing device 100 may share the observations received from other devices, with computing device 100. For example, computing device 100 may send the group of activation signals described above to a remote computing device. The remote computing device 100 may store the group of activation signals within a data store used by a machine learning system of the remote computing device. Computing device 100 may receive information from the remote computing device usable to determine whether a sensor device can detect a signal.

Computing device 100 may activate at least one sensor device (e.g., sensor device 110A) based at least in part on whether the probability of the first signal being detectable by the first sensor device exceeds the threshold. For example, signal interpret module 264 may utilize the machine learning system of training module 266 to determine the probability that cellular radio 110A can detect cellular signal 140A. If the probability received by signal interpret module 264 from training module 266 exceeds a minimum threshold (e.g. 50-10%), signal interpret module may determine cellular radio 110A can detect cellular signal 140A and send a command to signal detect module 260 to activate cellular radio 110A.

Rather than relying on signal detect module 260 to determine a sensor device 110 cannot detect a signal 140, signal interpret module 264 may utilize the machine learning system of training module 266 to determine if a particular sensor device 110 can detect a particular signal 140 and if not send a command to signal detect module 260 to deactivate that particular sensor device 110. For example, signal interpret module 264 may utilize the machine learning system of training module 266 to determine if signals detected by signal detect module 260 and/or the information received by Wi-Fi radio 110A indicate cellular radio 110A cannot detect cellular signal 140A. Signal interpret module 264 may query training module 266 to obtain a probability of whether cellular radio 110A can detect cellular signal 140A. If the probability received by signal interpret module 264 exceeds a minimum threshold (e.g. 50-10%), signal interpret module may determine cellular radio 110A cannot detect cellular signal 140A and send a command to signal detect module 260 to deactivate cellular radio 110A.

Similar to the manner described above, and to obtain a probability for signal interpret module 264, the machine learning system of training module 266 may determine a group of deactivation signals. The group of deactivation signals may represent each signal 140 detected by at least one sensor device 110 prior to (i.e. between 0 and 5 seconds before) determining that cellular radio 110A can no longer detect cellular signal 140A. For example, the group of deactivation signals may include Wi-Fi signal 140B, GPS signal 140C, and Bluetooth signal 140D.

The machine learning system of training module 266 may determine a correlation between the group of deactivation signals and the information received by the second sensor device. The correlation may indicate a degree of a relationship between the group of deactivation signals and the information. The degree may fall within a range of magnitudes (e.g. −1 to +1). For example, training module 266 may determine the group of deactivation signals includes Wi-Fi signal 140B, GPS signal 140C, and Bluetooth signal 140D. As explained above, second sensor module 262 may identify Wi-Fi radio 110B as a second sensor device because Wi-Fi radio 110B can detect Wi-Fi signal 140B. Signal interpret module 264 may determine Wi-Fi signal 140B includes an SSID. Training module 266 may determine a correlation between computing device 100 detecting Wi-Fi signal 140B, GPS signal 140C, and Bluetooth signal 140D when Wi-Fi signal 140B includes data including the SSID associated with Wi-Fi signal 140B. The correlation may indicate the strength of a relationship between computing device 100 receiving Wi-Fi signal 140B including a SSID and detecting the deactivation signals (i.e., Wi-Fi signal 140B, GPS signal 140C, and Bluetooth signal 140D).

The machine learning system of training module 266 may create a rule based on the correlation and store the rule within rules data store 290. The rule may indicate that if computing device 100 can detect Wi-Fi signal 140B, GPS signal 140C, and Bluetooth signal 140D, and if Wi-Fi radio 110B detects Wi-Fi signal 140B with a particular SSID, then cellular radio 110A cannot detect cellular signal 140A. Based at least in part on the correlation, the machine learning system of training module 266 may determine a probability of cellular radio 110A detecting cellular signal 140A based at least in part on the correlation. For example, using the rule created by the machine learning system of training module 266 and stored within rules data store 290, training module 266 may assign a probability to cellular radio 110A not detecting cellular signal 140A. Training module 266 may transmit the probability to signal interpret module 264 and if the probability exceeds a threshold (e.g. 50-100%) signal interpret module 264 may determine cellular radio 110A cannot detect cellular signal 140A. Signal interpret module 264 may send a command over communication channels 240 to signal detect module 260 to deactivate cellular radio 110A. Upon receiving the command, signal detect module 260 may deactivate cellular radio 110A.

Computing device 100 may allow a user of the computing device to manually activate and deactivate a sensor device 110. For example, signal detect module 260 may deactivate cellular radio 110A based on a command received from signal interpret module 264 in the manner described above. Input device 220 of computing device may receive an input from a user. Input device 220 may transmit the input over communication channels 240 to signal detect module 260. In response to the input received, signal detect module 260 may activate cellular radio 110A. The machine learning system of training module 266 may determine a probability of a sensor device 110 detecting a signal 140 based at least in part on an input from a user. The machine learning system of training module 266 may utilize the input like any signal 140 received by any sensor device 110. For example, the machine learning system of training module 266 may store the input received by input device 220 (mentioned above to activate sensor device 110A) as part of a signal profile stored within observations data store 292 and used to modify one or more rules stored in rules data store 290 based.

Signal interpret module 264 of computing device 100 may query the machine learning system of training module 266 for an operation probability indicating the probability of an operation being performed. Signal interpret module 264 may determine if the operation probability received from training module 266 exceeds a threshold. The operation being performed may correspond to using a mode of transit. For example, a mode of transit may include traveling by car, taxi, bus, train, subway, airplane, boat, ship, or foot. Signal interpret module 264 may send a command to signal detect module 260 to deactivate at least one sensor device from the group of sensor devices based at least in part on whether the operation probability exceeds a threshold. Likewise, signal interpret module 264 may send a command to signal detect module 260 to activate at least one sensor device from the group of sensor devices based at least in part on whether the operation probability exceeds a threshold.

For example, signal interpret module 264 may execute within a portable computing device 100. A user of portable computing device 100 may operate portable computing device 100 while traveling on an airplane. The machine learning system of training module 266 may determine the operation probability of the user of computing device 100 traveling by airplane. If the operation probability of computing device 100 traveling by airplane exceeds a threshold (e.g. 50-10%), signal interpret module 264 may determine neither cellular radio 110A nor 3G radio 110E can likely detect a corresponding signal. Signal interpret module 264 may send commands to signal detect module 260 to deactivate cellular radio 110A and 3G radio 110E to conserve battery power.

The machine learning system of training module 266 may determine an operation probability using similar methods described above using previously stored observations and rules to determine the probability of an operation being performed. For example, the machine learning system of training module 266 may determine a group of operation signals. The group of operation signals may represent each signal 140 detected by at least one sensor device 110. For example, the group of operation signals detected by computing device 100 while the airplane becomes airborne may include Wi-Fi signal 140B and GPS signal 140C.

The machine learning system of training module 266 may determine a correlation between the group of operation signals and the information received by one or more sensor device. The correlation may indicate a degree of a relationship between the group of operation signals and the information. The degree may fall within a range of degrees of magnitudes (e.g. −1 to +1). For example, training module 266 may determine the group of operation signals includes Wi-Fi signal 140B and GPS signal 140C. Signal interpret module 264 may determine Wi-Fi signal 140B includes an SSID associated with an inflight wireless network. Signal interpret module 264 may also determine GPS signal 140C includes information indicating a geographic location over the Atlantic Ocean. Training module 266 may determine a correlation between computing device 100 detecting Wi-Fi signal 140B and GPS signal 140C, when Wi-Fi signal 140B includes data including the SSID of an inflight wireless network and GPS signal 140C includes information indicating a geographic location over the Atlantic Ocean. The correlation may indicate the strength of a relationship between computing device 100 receiving Wi-Fi signal 140B including a SSID of an inflight wireless network and GPS signal 140C including a geographic location over the Atlantic Ocean.

The machine learning system of training module 266 may create a rule based on the correlation and store the rule within rules data store 290. The rule may indicate a user traveling by airplane if computing device 100 can detect Wi-Fi signal 140B and GPS signal 140C and if Wi-Fi radio 110B detects Wi-Fi signal 140B with a particular SSID and GPS signal 140C detects GPS signal 140C with a particular location. Based at least in part on the correlation, the machine learning system of training module 266 may determine an operation probability of an operation being performed based at least in part on the correlation. For example, using the rule created by the machine learning system of training module 266 and stored within rules data store 290, training module 266 may assign a probability to a user traveling by airplane. Training module 266 may transmit the probability to signal interpret module 264 and if the probability exceeds a threshold (e.g. 50-100%) signal interpret module 264 may determine cellular radio 110A cannot detect cellular signal 140A and 3G radio 110E cannot detect 3G signal 140E. Signal interpret module 264 of computing device 100 may send a command to signal detect module 260 to activate and/or deactivate a sensor device 110 based at least in part on whether the operation probability exceeds a threshold.

The machine learning system of training module 266 may require training module 266 to store multiple signal observations in observations data store 292 before the machine learning system can create accurate rules. Computing device 100 may activate and deactivate sensor devices 110 without using the machine learning system of training module 266. For example, after signal detect module 260 determines sensor device 110A cannot detect signal 140A, signal detect module 260 may deactivate sensor device 110A. Signal detect module 260 may poll, at a periodic rate, for signal 140A using sensor device 110A. To poll for signal 140A after deactivating sensor device 110A, signal detect module 260 may momentarily activate sensor device 110A and determine if sensor device 110A can detect signal 140A. If sensor device 110A cannot detect signal 140A, signal detect module may deactivate sensor device 110A again. Signal detect module 260 may repeat the process of periodically activating and deactivating sensor device 110A (i.e. polling) until sensor device 110A can detect signal 140A.

To minimize battery drain generally caused by excessive polling, signal detect module 260 may poll for signals 140 at a variable periodic rate (e.g. computing device 100 may use a truncated exponential back-off module to determine the periodic rate). For example, the variable periodic rate determined by the truncated exponential back-off module may lie within a range of rates. The truncated exponential back-off module may bound the range of rates with a minimum rate (e.g. the range may include multiple selectable rates between a minimum frequency of once per second and a maximum frequency of once per millisecond). The truncated exponential back-off module may randomly select the variable periodic rate from the range.

However, the range of rates may expand, up to a threshold (e.g. once per minute), to include a larger range rates after each successive non-successful attempt to detect a signal. For example, each time the truncated exponential back-off module executes, the truncated exponential back-off module of signal detect module 260 may determine if the minimum rate exceeds a threshold rate. If the minimum rate exceeds a threshold rate, the truncated exponential back-off system may decrease the minimum rate. If signal detect module 260 polls without detecting a signal 140 multiple consecutive times, the minimum rate may equal, but not exceed the threshold rate.

For example, the range of rates may begin as including values of once per second to once per millisecond. After multiple unsuccessful attempts of detecting a signal 140, the range may increase to include values between once per minute and once per millisecond. If signal detect module 260 further continues to not detect a signal 140, the range may increase to include values between once per five minutes and once per millisecond. However if signal detect module 260 still cannot detect a signal 140 after further multiple polling attempts, the exponential back-off module may limit the minimum rate and determine the minimum rate cannot exceed once per five minutes. Therefore the range may never expand beyond once per five minutes to once per millisecond.

Figure 3:
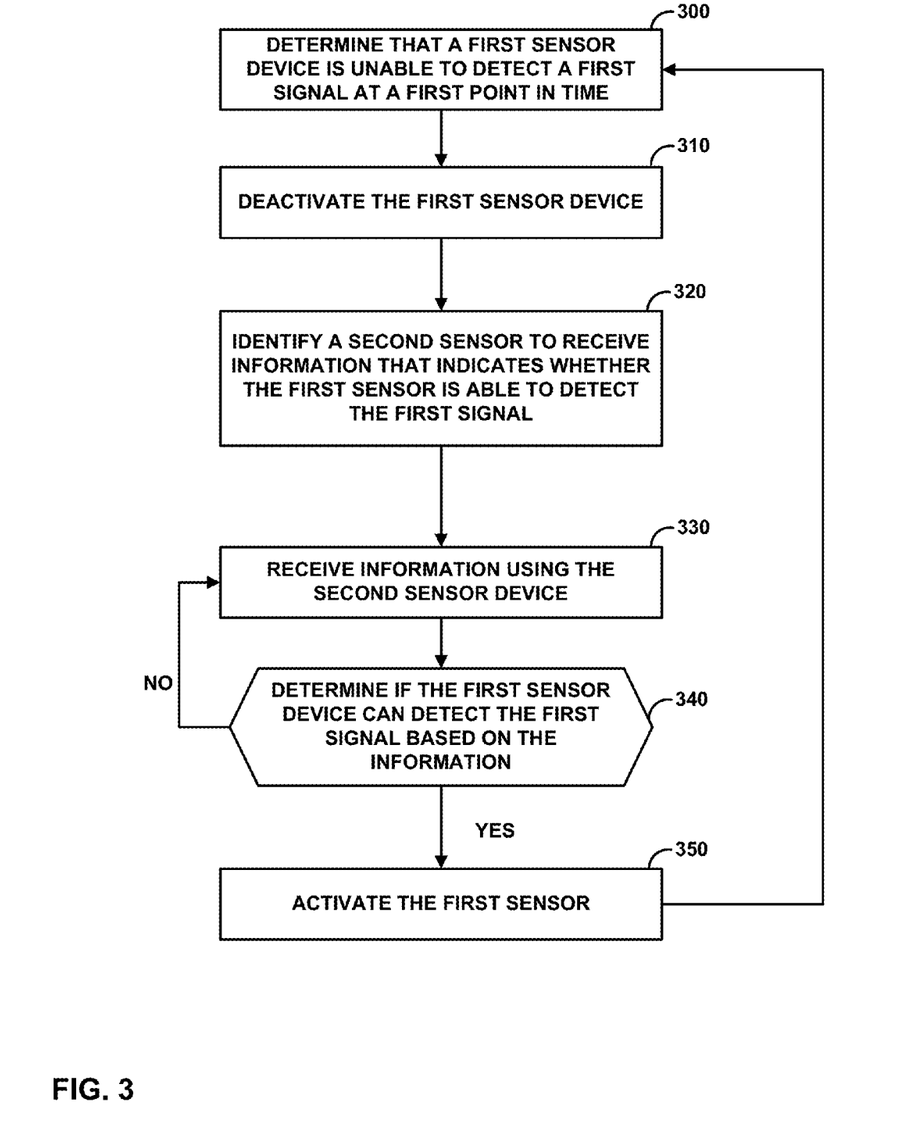
FIG. 3 is a flowchart illustrating an example operation of the computing device.

FIG. 3 is a flowchart illustrating example operations of a computing device in accordance with techniques of the disclosure. One or more processors of a computing device, such as the computing device illustrated in FIG. 2, may perform the method of FIG. 3. For purposes of illustration, FIG. 3 is described below within the context of computing device 100 of FIGS. 1 and 2.

Computing device 100 may determine that a first sensor device 110A is unable to detect a first signal 140A at a first point in time (300). For example, computing device 100 may determine cellular radio 110A cannot detect cellular signal 140A. Computing device 100 may deactivate the first sensor device 110A (310). For example signal detect module 260 of computing device 100 may deactivate cellular radio 110A. Computing device 100 may identify a second sensor device 110B to receive information that indicates whether first sensor 110A is able to detect first signal 140A (320). For example, signal detect module 260 of computing device 100 may determine Wi-Fi radio 110B can detect Wi-Fi signal 140B. Second sensor module 262 of computing device 100 may identify Wi-Fi radio 110B as the second sensor device because Wi-Fi radio 110B can receive a SSID usable determine if cellular radio 110A can detect cellular signal 140A and Wi-Fi radio 110B can also detect Wi-Fi signal 140B.

Computing device 100 may receive information using the second sensor device 110B (330). For example, Wi-Fi radio 110B may receive Wi-Fi signal 140B and signal interpret module 264 of computing device 100 may identify an SSID within Wi-Fi signal 140B. Computing device 100 may determine first sensor device 110A can detect first signal 140A based on the information. Computing device 100 may activate first sensor device 110A (340). For example signal interpret module 264 may determine, based at least in part on the SSID included within Wi-Fi signal 140B, that cellular radio 110A can detect cellular signal 140A. In response, signal interpret module 264 may send a command to signal detect module 260 to activate cellular radio 110A.

Figure 4:
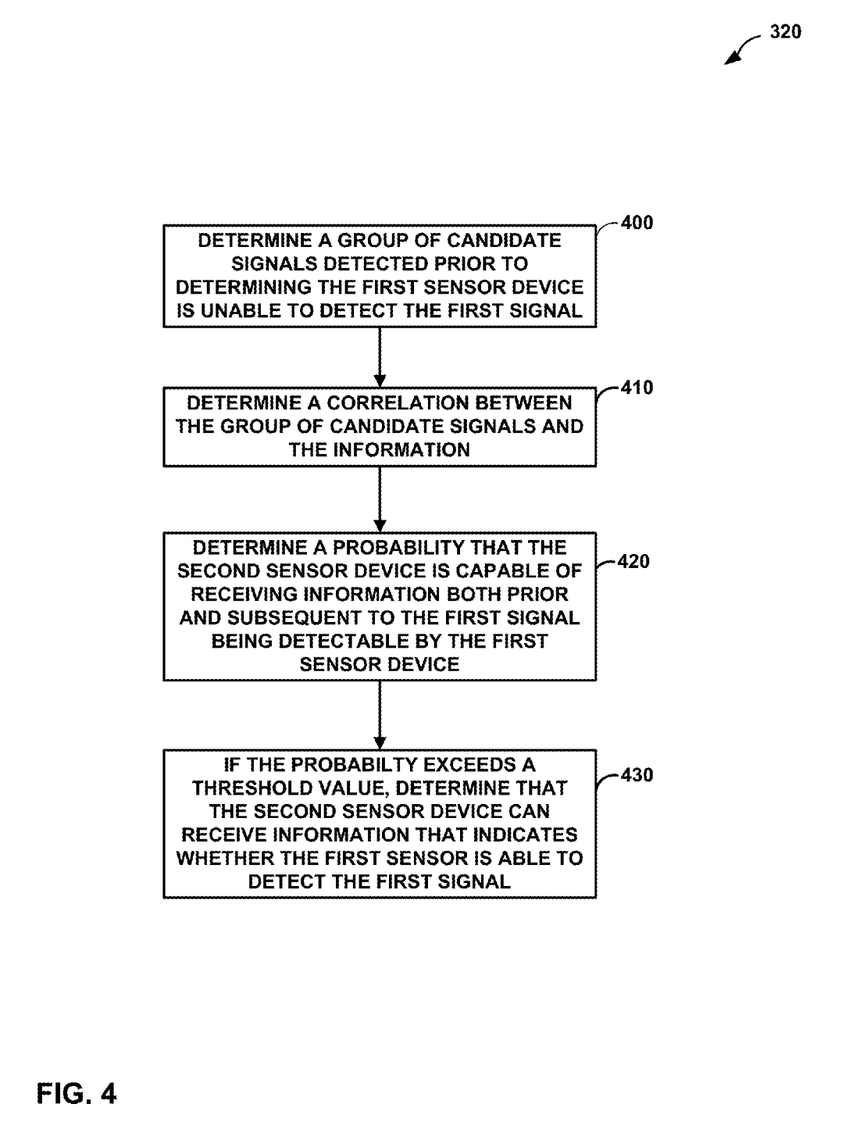
FIG. 4 is a flowchart illustrating an example operation of the computing device.

FIG. 4 is a flowchart illustrating example operations of a computing device in accordance with techniques of the disclosure. One or more processors of a computing device, such as the computing device illustrated in FIG. 2, may perform the method of FIG. 4. For purposes of illustration, FIG. 4 is described below within the context of computing device 100 of FIGS. 1 and 2. FIG. 4 illustrates in further detail an example operation of step 320 from FIG. 3.

In order to identify a second sensor device 110B capable of receiving information usable to determine whether a first sensor device 110A can detect a first signal 140A, computing device 100 may determine a probability of whether the second sensor device 110B can receive information prior to the first sensor device 110A not detecting the first signal 140A and subsequent to the first sensor device 110A detecting the first signal 140A. To determine the probability, the computing device may determine a group of candidate signals detected prior to determining first sensor device 110A is unable to detect the first signal 140A (400). For example, to determine the second sensor device 110B, second sensor module 262 of computing device 100 may query training module 266 for a probability indicating the likelihood of whether Wi-Fi radio 110B can detect Wi-Fi signal 140B even though cellular radio 110A cannot detect cellular signal 140A. To calculate the probability, training module 266 may utilize a machine learning system.

The machine learning system may determine a first group of signals that computing device 100 detected before determining cellular radio 110A could not detect cellular signal 140A. The machine learning system of training module 266 may determine a second group of signals that computing device 100 can detect after determining cellular radio 110A cannot detect cellular signal 140A. The machine learning system of training module 266 may determine a group of candidate signals that includes each signal in both the first and second groups. The group of candidate signals represents the signals detected by computing device 100 both before and after losing cellular signal 140A.

Computing device 100 may determine a correlation between the group of candidate signals and the information (i.e., the information received by second sensor device 110B (410). The correlation indicates a degree of a relationship between the third group of signals and the information and the degree is within a range of degrees of magnitudes. For example, the machine learning system of training module 266 may determine a correlation between the group of candidate signals and a SSID within Wi-Fi signal 140B detected by Wi-Fi radio 110B. The correlation may indicate strength of a relationship between the SSID and the group of candidate signals.

Computing device 100 may determine a probability that the second sensor device 110B is capable of receiving the information prior and subsequent to the first signal 140A being detectable by the first sensor device 110A (420). For example, based at least in part on the correlation, the machine learning system of training module 266 may determine a probability of whether Wi-Fi sensor 110B can detect a SSID from a Wi-Fi signal 140B both before and after computing device 100 determines cellular radio 110A cannot detect cellular signal 140A.

Machine learning system of training module 266 may use a previously developed rule stored in rules data store 290 to determine the probability. If the probability exceeds a threshold, computing device 100 may determine the second sensor device 110B can receive information that indicates whether the first sensor is able to detect the first signal (430). For example, if the probability received from training module 266 exceeds 90%, second sensor module 262 may identify Wi-Fi radio 110B as the second sensor device.

Figure 5:
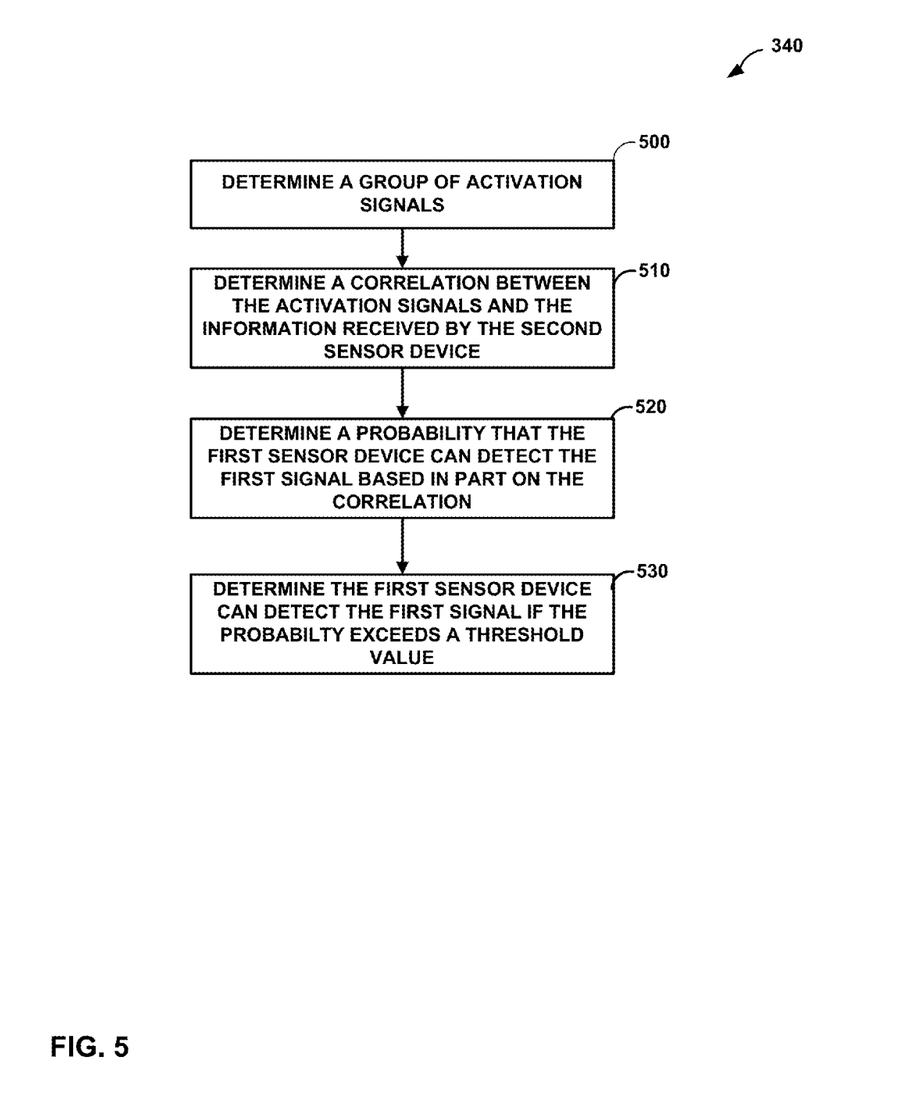
FIG. 5 is a flowchart illustrating an example operation of the computing device.

FIG. 5 is a flowchart illustrating example operations of a computing device, in accordance with techniques of the disclosure. One or more processors of a computing device, such as the computing device illustrated in FIG. 2, may perform the method of FIG. 5. For purposes of illustration, FIG. 5 is described below within the context of computing device 100 of FIGS. 1 and 2. FIG. 5 illustrates in further detail an example operation of step 340 from FIG. 3.

To determine if a first sensor device 110A can detect a first signal 140A and therefore, determine if computing device 100 should activate the first sensor device 110A, signal interpret module 264 may query the machine learning system of training module 266 for a probability of whether the first sensor device 110A (e.g. cellular radio 110A) can detect the first signal 140A (e.g. cellular signal 140A). If the probability received by signal interpret module 264 exceeds a threshold, signal interpret module 264 may determine the first sensor device 110A can detect the first signal 140A. To determine the probability, training module 266 of computing device may determine a group of activation signals (500). Each signal of the group of activation signals is detected by at least one sensor of the group of sensors 110 subsequent to determining that the first signal 140A is no longer detectable by the first sensor device 110A. For example training module 266 may retrieve from observations data store 292 a group of activation signals previously observed (i.e., all signals detected by signal detect module 260) by the machine learning system after computing device 100 determines cellular radio 110A can detect cellular signal 140A. Training module 266 of computing device 100 may determine a correlation between the group of activation signals and the information received by the second sensor device 110B (510). The correlation indicates a degree of a relationship between the group of activation signals and the information received by the second sensor device 110B and the degree is within the range of degrees of magnitudes. For example, similar to the methods described above in relation to FIGS. 2 and 3, the machine learning system of training module 266 may determine a correlation between the activation signals and the SSID included within Wi-Fi signal 140B. The correlation may indicate the strength of a relationship between cellular radio 110A detecting cellular signal 140A when the computing device simultaneously detects the activation signals and the SSID. A correlation represented by a value of +1 may indicate a strong relationship and a value of −1 may indicate a weak relationship.

Training module 266 of computing device 100 may determine a probability that the first sensor device 110A can detect the first signal 140A based at least in part on the correlation (520). For example, based at least in part on the correlation, the machine learning system of training module 266 may determine a probability of whether cellular radio 110A can detect cellular signal 140B when computing device 100 detects a particular SSID and the activation signals. The machine learning system of training module 266 may use a previously developed rule stored in rules data store 290 to determine the probability. Computing device 100 may determine the first sensor device can detect the first signal if the probability exceeds a threshold value (530). If so, computing device 100 may determine the first sensor device 110A can detect the first signal 140A. For example, if the probability received from training module 266 exceeds, for example 50%, signal interpret module 264 may determine cellular radio 110A can detect cellular signal 140A.

In some examples, the operations may include determining, by the computing device, a probability of whether the second sensor device is capable of receiving information both prior and subsequent to the first signal being detectable by the first sensor device. The operations may also include determining, by the computing device, that the second sensor device can receive information that indicates whether the first sensor is able to detect the first signal, if the probability exceeds a threshold.

In some examples, the operations may include determining, by the computing device, a group of candidate signals each of which is detected by at least one sensor of a group of sensor devices operatively coupled to the computing device prior to determining that the first sensor device is unable to detect the first signal and subsequent to determining that the first sensor device is able to detect the first signal. The group of sensor devices comprises the first and second sensor devices. The operations may also include determining, by the computing device, a correlation between the group of candidate signals and the information received by the second sensor device. The correlation may indicate a degree of a relationship between the group of candidate signals and the information received by the second sensor device, and wherein the degree is within a range of magnitudes. The operations may include determining, by the computing device and based at least in part on the correlation, a probability that the second sensor device is capable of receiving the information both prior and subsequent to the first signal being detectable by the first sensor device.

In some examples, the operations may include polling, by the computing device, for the first signal by the first sensor device at a periodic rate of time. The computing device may poll by activating the first sensor device. Polling may further include determining, by the computing device, if the first signal is detectable by the first sensor device. The computing device may further poll by deactivating the first sensor device if the first signal is not detectable by the first sensor device.

In some examples, when the computing device polls for the first signal, the periodic rate is a variable periodic rate within a range of periodic rates that is bounded by a minimum rate. If the minimum rate is faster than a threshold rate, the operations may include decreasing the minimum rate. The operations may also include selecting, the variable periodic rate at random, from the range of periodic rates.

In some examples, the information received using the second sensor device (i.e., the information that indicates the first signal is detectable by the first sensor device) may include data representative of a device location, a device direction, a device speed, a device acceleration, a device orientation, or a network service set identifier.

In some examples, the operations may include determining, by the computing device, a group of activation signals each of which is detected by at least one sensor of a group of sensor devices operatively coupled to the computing device subsequent to determining that the first signal is detectable by the first sensor device. The group of sensor devices comprises the first and second sensor devices. The operations may also include determining, by the computing device, a correlation between the group of activation signals and the information received by the second sensor device. The correlation may indicate a degree of a relationship between the group of activation signals and the information and the degree may be within a range of magnitudes. The operations may also include determining, by the computing device, a probability of the first signal being detectable by the first sensor device based at least in part on the correlation. The operations may also include determining, by the computing device, whether the probability of the first signal being detectable by the first sensor device exceeds a threshold.

In some examples, to determine the probability of the first signal being detectable by the first sensor device, the computing device may receive the probability from a remote computing device.

In some examples, the operations may further include activating, by the computing device, at least one sensor device from the group of sensor devices based at least in part on whether the probability of the first signal being detectable by the first sensor device exceeds the threshold.

In some examples, the operations may also include determining, by the computing device, a group of deactivation signals each of which is detected by at least one sensor of the group of sensors prior to determining that the first sensor device is unable to detect the first signal. The operations may also include determining, by the computing device, a second correlation between the group of deactivation signals and the information received by the second sensor device. The second correlation may indicate a degree of a relationship between the group of deactivation signals and the information received by the second sensor device and the degree may be within a range of magnitudes. The operations may further include determining, by the computing device, the probability of the first signal being detectable by the first sensor device based at least in part on the second correlation. The operations may further include determining, by the computing device, whether the probability of the first signal being detectable by the first sensor device exceeds the threshold.

In some examples, the operations may also include deactivating, by the computing device, at least one sensor device from the group of sensor devices based at least in part on whether the probability of the first signal being detectable by the first sensor device does not exceed the threshold.

In some examples the computing device may be associated with a user. The operations may include receiving, by the computing device, an input from the user. The operations may also include activating, by the computing device, the first sensor device in response to receiving the input from the user.

In some examples, the operations may also include determining, by the computing device, the probability of the first signal being detectable by the first sensor device, based at least in part on the input from the user.

In some examples, the operations may also include determining, by the computing device, an operation probability of an operation being performed by the computing device, based at least in part on the correlation the correlation between the group of activation signals and the information received by the second sensor device. The operations may also include determining, by the computing device, whether the operation probability exceeds an operation threshold.

In some examples, the operations may also include deactivating, by the computing device, at least one sensor device from the group of sensor devices based at least in part on whether the operation probability exceeds the operation threshold.

In some examples, the operations may also include activating, by the computing device, the at least one sensor device from the group of sensor devices based at least in part on whether the operation probability exceeds the operation threshold.

In some examples, the operation being performed may be the operation of using a mode of transit. The mode of transit may be selected from a group consisting of traveling by car, traveling by taxi, traveling by bus, traveling by train, traveling by subway, traveling by airplane, traveling by boat, traveling by ship, and traveling by foot.

In some examples, the operations may also include sending, by the computing device, the group of activation signals to a remote computing device. The group of activation signals may be storable at the remote computing device as information within a data store. The operations may also include receiving, by the computing device, the information usable to determine whether the first signal is detectable by the first sensor device, from the remote computing device.

In some examples, where the computing device is a first computing device, the information received from the remote computing device may be based at least in part on activation signals of at least a second computing device.

In some examples, determining, by the computing device, that a first signal is no longer detectable by a first sensor device of a group of sensor devices operably coupled to the computing device may include determining that the first signal comprises a signal strength that is below a strength threshold.

In describing some of the above examples, the term detectable signal may be used to describe a signal that a sensor device can detect. In other words, if a sensor device is able to detect a signal, than the signal is detectable by the sensor device. If a sensor device is not able to detect a signal, than the signal is not detectable by the sensor device.

In one or more examples, the operations described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
in response to determining, by a computing device, that a first sensor device of the computing device is unable to detect a first signal at a first point in time, determining, by the computing device, a probability that indicates whether a second sensor device of the computing device is capable of receiving information prior to the first signal being detectable by the first sensor device;
in response to determining that the probability satisfies a threshold probability, determining, by the computing device, that the second sensor device can receive information that indicates whether the first sensor is able to detect the first signal;
receiving, by the computing device using the second sensor device, the information, wherein the information is usable by the computing device to determine whether the first sensor device can detect the first signal;
determining, based at least in part on the information and by the computing device, that the first sensor device is able to detect the first signal at a second point in time;
responsive to determining the first sensor device is able to detect the first signal at the second point in time, activating, by the computing device, the first sensor device.

2. The method of claim 1, wherein determining the probability comprises:
determining, by the computing device, a group of candidate signals each of which is detected by at least one sensor of a group of sensor devices operably coupled to the computing device, prior to determining that the first sensor device is unable to detect the first signal and subsequent to determining that the first sensor device is able to detect the first signal, wherein the group of sensor devices comprises the first and second sensor devices;
determining, by the computing device, a correlation between the group of candidate signals and the information received by the second sensor device, wherein the correlation indicates a degree of a relationship between the group of candidate signals and the information received by the second sensor device, and wherein the degree is within a range of magnitudes; and determining, by the computing device and based at least in part on the correlation, the probability that the second sensor device is capable of receiving information prior to the first signal being detectable by the first sensor device.

3. The method of claim 1, wherein prior to determining that the first sensor device is unable to detect the first signal, the method further comprises:

polling, by the computing device, for the first signal by the first sensor device at a periodic rate of time, wherein the polling comprises:

activating, by the computing device, the first sensor device;

determining, by the computing device, if the first signal is detectable by the first sensor device; and deactivating, by the computing device, the first sensor device if the first signal is not detectable by the first sensor device.

4. The method of claim 3, wherein the periodic rate is a variable periodic rate within a range of periodic rates, wherein the range of periodic rates is bounded by a minimum rate, the method further comprising:

determining, by the computing device, the variable periodic rate at least by:

if the minimum rate is faster than a threshold rate, decreasing the minimum rate; and selecting at random, from the range of periodic rates, the variable periodic rate.

5. The method of claim 1, wherein the information received using the second sensor device includes data representative of a device location, a device direction, a device speed, a device acceleration, a device orientation, or a network service set identifier.

6. The method of claim 1, wherein the probability is a first probability and the threshold probability is a first threshold probability, the method further comprising:

determining, by the computing device, a group of activation signals each of which is detected by at least one sensor of a group of sensor devices operatively coupled to the computing device subsequent to determining that the first signal is detectable by the first sensor device, wherein the group of sensor devices comprises the first and second sensor devices;

determining, by the computing device, a correlation between the group of activation signals and the information received by the second sensor device, wherein the correlation indicates a degree of a relationship between the group of activation signals and the information, wherein the degree is within a range of magnitudes;

determining, by the computing device, a second probability of the first signal being detectable by the first sensor device based at least in part on the correlation; and determining, by the computing device, whether the second probability of the first signal being detectable by the first sensor device exceeds a second threshold probability.

7. The method of claim 6, further comprising:

activating, by the computing device, at least one sensor device from the group of sensor devices based at least in part on whether the second probability of the first signal being detectable by the first sensor device exceeds the second threshold probability.

8. The method of claim 6, wherein the correlation between the group of activation signals and the information received by the second sensor device is a first correlation, the method further comprising:

determining, by the computing device, a group of deactivation signals each of which is detected by at least one sensor of the group of sensors prior to determining that the first sensor device is unable to detect the first signal;

determining, by the computing device, a second correlation between the group of deactivation signals and the information received by the second sensor device, wherein the second correlation indicates a degree of a relationship between the group of deactivation signals and the information received by the second sensor device, wherein the degree is within a range of magnitudes;

determining, by the computing device, the second probability of the first signal being detectable by the first sensor device based at least in part on the second correlation; and determining, by the computing device, whether the second probability of the first signal being detectable by the first sensor device exceeds the second threshold probability.

9. The method of claim 8, further comprising:

deactivating, by the computing device, at least one sensor device from the group of sensor devices based at least in part on whether the second probability of the first signal being detectable by the first sensor device does not exceed the second threshold probability.

10. The method of claim 6, wherein the computing device is associated with a user, the method further comprising:

receiving, by the computing device, an input from the user; and responsive to receiving the input from the user, activating, by the computing device, the first sensor device.

11. The method of claim 10, further comprising:

determining, by the computing device, the second probability of the first signal being detectable by the first sensor device, based at least in part, on the input from the user.

12. The method of claim 6, further comprising:

determining, by the computing device, a third probability that indicates whether an operation is being performed by a user associated with the computing device, based at least in part on the correlation; and determining, by the computing device, whether the operation probability exceeds third threshold probability.

13. The method of claim 12, further comprising:

deactivating, by the computing device, at least one sensor device from the group of sensor devices based at least in part on whether the third probability exceeds the third threshold probability.

14. The method of claim 12, further comprising:

activating, by the computing device, the at least one sensor device from the group of sensor devices based at least in part on whether the third probability exceeds the third threshold probability.

15. The method of claim 12, wherein the operation being performed is the operation of using a mode of transit, wherein the mode of transit is selected from a group consisting of traveling by car, traveling by taxi, traveling by bus, traveling by train, traveling by subway, traveling by airplane, traveling by boat, traveling by ship, and traveling by foot.

16. The method of claim 6, further comprising:

sending, by the computing device, the group of activation signals to a remote computing device, wherein the group of activation signals is storable at the remote computing device as information within a data store; and receiving, by the computing device, the information usable to determine whether the first signal is detectable by the first sensor device from the remote computing device.

17. The method of claim 1, wherein determining that the first sensor device is unable to detect the first signal includes determining that the first signal comprises a signal strength that is below a strength threshold.

18. A non-transitory computer-readable storage medium comprising instructions that, when executed, cause one or more processors of a computing device to perform operations comprising:
- in response to determining, that a first sensor device of the computing device is unable to detect a first signal at a first point in time, determining, a probability that indicates whether a second sensor device of the computing device is capable of receiving information prior to the first signal being detectable by the first sensor device;
- in response to determining that the probability satisfies a threshold, determining, that the second sensor device can receive information that indicates whether the first sensor is able to detect the first signal;
- receiving, using the second sensor device, the information, wherein the information is usable to determine whether the first sensor device can detect the first signal;
- determining, based at least in part on the information, that the first sensor device is able to detect the first signal at a second point in time; and
- responsive to determining that the first sensor device is able to detect the first signal at the second point in time, activating the first sensor device.

19. A system comprising:
- one or more processors;
- a plurality of sensor devices comprising at least a first sensor device and a second sensor device; and
- at least one module executable by the one or more processors to:
- in response to determining that the first sensor device is unable to detect a first signal at a first point in time, determine a probability that indicates whether the second sensor device is capable of receiving information prior to the first signal being detectable by the first sensor device;
- in response to determining that the probability satisfies a threshold, determine that the second sensor device can receive information that indicates whether the first sensor is able to detect the first signal;
- receive, using the second sensor device, the information, wherein the information is usable to determine whether the first sensor device can detect the first signal;
- determine, based at least in part on the information, that the first sensor device is able to detect the first signal at a second point in time; and
- responsive to determining that the first sensor device is able to detect the first signal at the second point in time, activate the first sensor device.

20. The method of claim 1, wherein the probability indicates whether the second sensor device of the computing device is capable of receiving information both prior to and subsequent to the first signal being detectable by the first sensor device.

* * * * *